United States Patent
Choi

(10) Patent No.: US 8,493,685 B2
(45) Date of Patent: Jul. 23, 2013

(54) BASE ASSEMBLY FOR MOTOR AND HARD DISK DRIVE INCLUDING THE SAME

(75) Inventor: Tae Young Choi, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/418,873

(22) Filed: Mar. 13, 2012

(65) Prior Publication Data

US 2013/0120871 A1    May 16, 2013

(30) Foreign Application Priority Data

Nov. 16, 2011   (KR) ........................ 10-2011-0119579

(51) Int. Cl.
   *G11B 17/00*        (2006.01)
(52) U.S. Cl.
   USPC ........................................ 360/97.11
(58) Field of Classification Search
   USPC .......... 360/97.11, 97.12, 97.13, 97.14, 97.15, 360/97.16, 97.2, 97.21, 264.2, 246.1, 265.5
   See application file for complete search history.

(56) References Cited

U.S. PATENT DOCUMENTS

| | | | |
|---|---|---|---|
| 4,843,511 A * | 6/1989 | Downey ........................ | 360/133 |
| 5,796,696 A * | 8/1998 | Shigenai et al. .............. | 720/677 |
| 5,872,679 A * | 2/1999 | Boigenzahn et al. ....... | 360/97.13 |
| 6,285,524 B1 * | 9/2001 | Boigenzahn et al. ....... | 360/99.13 |
| 6,399,179 B1 * | 6/2002 | Hanrahan et al. ............ | 428/131 |
| 6,690,539 B2 * | 2/2004 | Gallo et al. ................. | 360/97.11 |
| 6,862,738 B2 * | 3/2005 | Wu et al. ...................... | 720/651 |
| 7,092,202 B1 * | 8/2006 | Orr et al. ..................... | 360/99.13 |
| 7,295,398 B2 * | 11/2007 | McMaster et al. .......... | 360/97.16 |
| 7,583,471 B2 * | 9/2009 | Xu et al. ..................... | 360/97.11 |
| 8,194,346 B2 * | 6/2012 | Kubo .......................... | 360/97.19 |
| 8,230,453 B2 * | 7/2012 | Kusumi ...................... | 720/647 |
| 2008/0012443 A1 | 1/2008 | Tamaoka et al. | |
| 2010/0118437 A1 * | 5/2010 | Kong et al. ................. | 360/97.02 |

FOREIGN PATENT DOCUMENTS

JP        2008-5623        1/2008

* cited by examiner

*Primary Examiner* — Allen T Cao

(57) ABSTRACT

There is provided a base assembly for a motor, the base assembly including: a base body having a disk disposed thereon; an outer wall part defining an outer side of the base body; one or more ribs depressed from one surface of the base body and protruded toward the other surface thereof to thereby improve rigidity of the base body; and one or more blocking parts provided in the ribs to thereby block abnormal air flow due to the ribs at a time of rotation of the disk.

12 Claims, 17 Drawing Sheets

BASE ASSEMBLY FOR MOTOR AND HARD DISK DRIVE INCLUDING THE SAME

CROSS-REFERENCE TO RELATED APPLICATIONS

This application claims the priority of Korean Patent Application No. 10-2011-0119579 filed on Nov. 16, 2011, in the Korean Intellectual Property Office, the disclosure of which is incorporated herein by reference.

BACKGROUND OF THE INVENTION

1. Field of the Invention

The present invention relates to a base assembly for a motor and a hard disk drive including the same, and more particularly, to a base assembly for a motor capable of preventing foreign objects from collecting in a center of a disk due to air flow while securing rigidity, and a hard disk drive including the same.

2. Description of the Related Art

A hard disk drive (HDD), a computer information storage device, reads data stored on a disk or writes data to the disk using a magnetic head.

In a hard disk drive, a base has a head driver installed thereon, that is, a head stack assembly (HSA), capable of altering a position of the magnetic head relative to the disk. The magnetic head performs its function while moving to a desired position in a state in which it is suspended above a writing surface of the disk by the head driver at a predetermined height.

According to the related art, in manufacturing a base provided in the hard disk drive, a post-processing scheme of die-casting aluminum (Al) and then removing burrs, or the like, generated due to the die-casting has been used.

However, in a die-casting process according to the related art, since a process of injecting molten aluminum (Al) for forging into a mold to form a shape for a component is performed, high temperatures and pressure are required, such that a large amount of energy is required in the process and a process time is increased.

Further, even in terms of a lifespan of a die-casting mold, there is a limitation in manufacturing a large number of bases using a single mold, and a base manufactured by the die-casting process has defects in dimensional precision.

Therefore, in order to solve defects in the die-casting process, a base has been manufactured using a press method. However, in the case of the pressing method, base rigidity may be reduced due to characteristics of a process of bending and cutting a plate.

Therefore, in order to secure base rigidity, a thickness of the plate needs to be increased. However, in this case, the weight of the base may be correspondingly increased, inappropriate for product miniaturization and thinning.

Therefore, research into a technology for securing rigidity of a base simultaneously with reducing weight thereof in manufacturing the base by press processing, to thereby improve performance and a lifespan of the base has been urgently demanded.

SUMMARY OF THE INVENTION

An aspect of the present invention provides a base assembly for a motor capable of preventing foreign objects from collecting in a center of a disk due to airflow while securing rigidity even in the case of the manufacturing thereof through press processing, and a hard disk drive including the same.

According to an aspect of the present invention, there is provided a base assembly for a motor, the base assembly including: a base body having a disk disposed thereon; an outer wall part defining an outer side of the base body; one or more ribs depressed from one surface of the base body and protruded toward the other surface thereof to thereby improve rigidity of the base body; and one or more blocking parts provided in the ribs to thereby block abnormal air flow due to the ribs at a time of rotation of the disk.

The blocking parts may be filled in a space formed by the ribs.

The blocking parts may have upper surfaces disposed co-planarly with upper surfaces of portions of the base body between the ribs.

The blocking parts may be coupled to the ribs by an injection process.

The blocking parts may be formed of a metallic material.

The blocking parts may be coupled to the ribs by at least one of a bonding method, a welding method, and an adhering method by an adhesive tape.

The blocking parts may include a shroud forming a clearance with an outer diameter of the disk and suppressing a generation of a vortex at the time of the rotation of the disk.

The blocking parts may be integrally formed.

The base body may include a rib connecting part connecting the ribs to each other, and the blocking parts may be formed integrally by a blocking part connecting part provided in the rib connecting part.

The ribs may have at least one of a circular arc shape, a helical shape, a spiral shape, a herringbone shape, and a radial shape.

According to another aspect of the present invention, there is provided a hard disk drive including: the base assembly for a motor of any one of claims 1 to 10; a spindle motor coupled to the base body to thereby rotate the disk; and a head driver moving a magnetic head to a predetermined position on the disk, the magnetic head writing data on the disk and reproducing data written on the disk.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
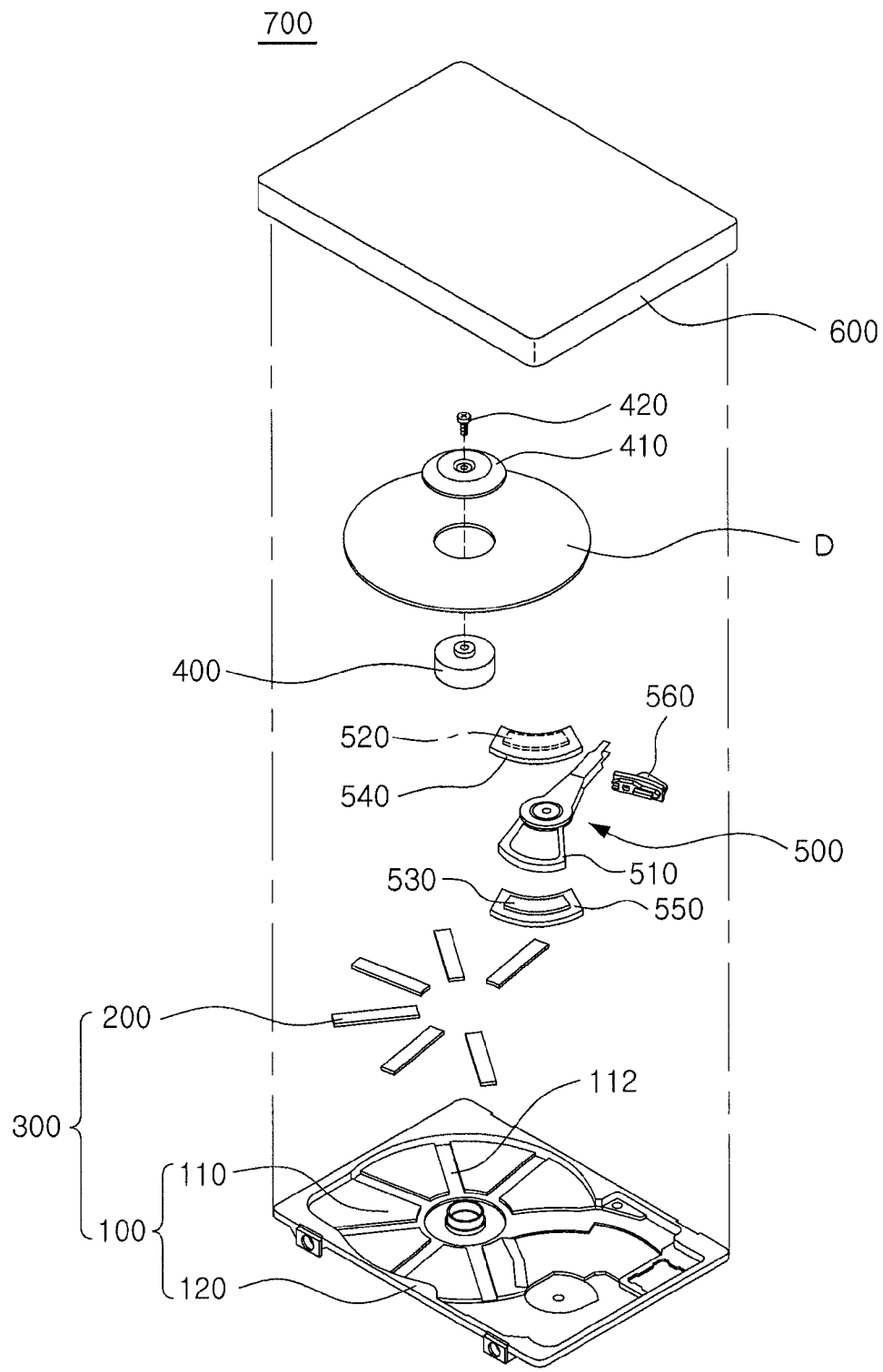
FIG. 1 is a schematic exploded perspective view showing a hard disk drive including a base assembly for a motor according to a first embodiment of the present invention.

Embodiments of the present invention will now be described in detail with reference to the accompanying drawings. However, it should be noted that the spirit of the present invention is not limited to the embodiments set forth herein and those skilled in the art and understanding the present invention can easily accomplish retrogressive inventions or other embodiments included in the spirit of the present invention by the addition, modification, and removal of components within the same spirit, but those are construed as being included in the spirit of the present invention.

Further, like reference numerals will be used to designate like components having similar functions throughout the drawings within the scope of the present invention.

Figure 2A:
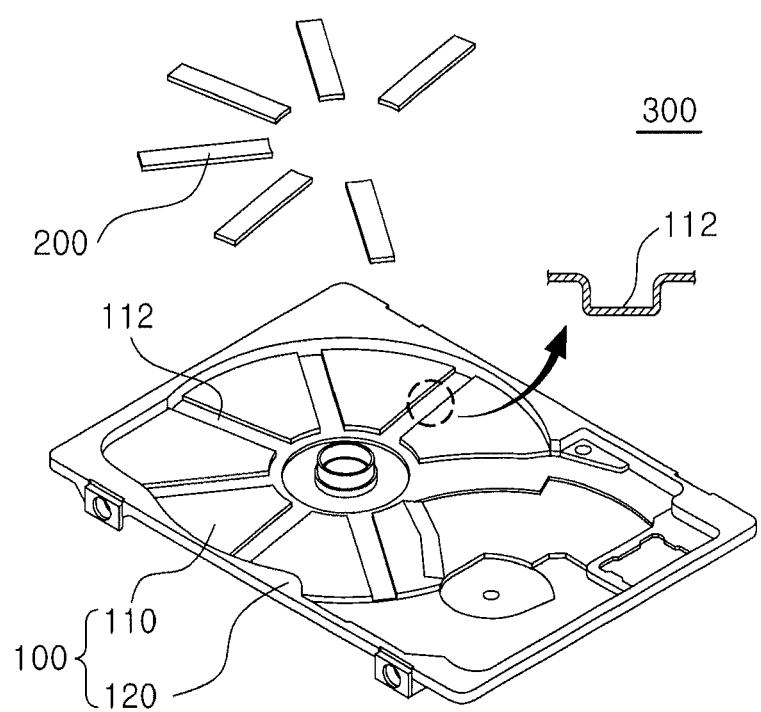
FIGS. 2A and 2B are, respectively, a schematic exploded perspective view and a schematic perspective view showing the base assembly for a motor according to the first embodiment of the present invention.
Figure 2B:
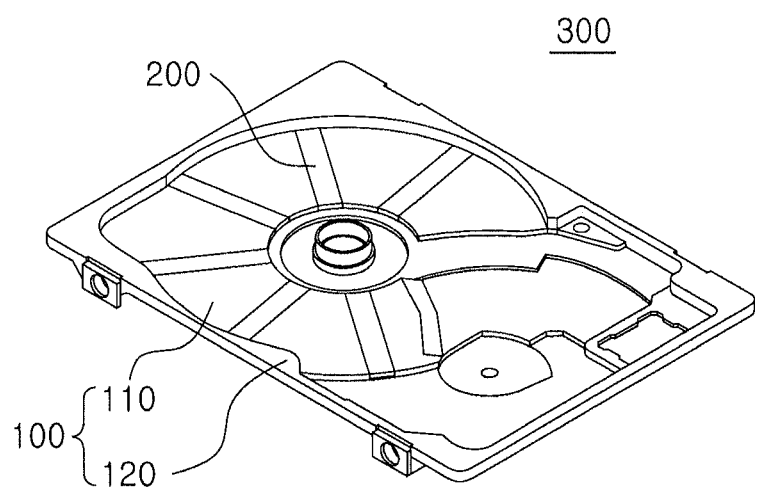

FIG. 1 is a schematic exploded perspective view showing a hard disk drive including a base assembly for a motor according to a first embodiment of the present invention; and FIGS. 2A and 2B are, respectively, a schematic exploded perspective view and a schematic perspective view showing the base assembly for a motor according to the first embodiment of the present invention.

Referring to FIGS. 1 through 2B, a hard disk drive 700 including a base assembly 300 for a motor (hereinafter, referred to as a base assembly) according to the first embodiment of the present invention may include the base assembly 300 including a base 100 for a motor (hereinafter, referred to as a base), a spindle motor 400, and a head driver 500.

The base assembly 300 may include the base 100 and one or more blocking parts 200. More specifically, the base 100 may include a base body 110 and an outer wall part 120.

Here, the base body 110 may form an internal space of the base 100, and the internal space means a space in which the spindle motor 400 and the head driver 500 to be described below are disposed.

Meanwhile, the base 100 may be a housing forming the exterior of the hard disk drive 700, together with a cover 600 in according to the embodiment of the present invention, and be fabricated to have a basic shape by press processing and then manufactured to have a final shape by bending, cutting, or the like, which is additional processing.

That is, the base 100 may be manufactured by performing a single process such as press processing or additional processes on a cold rolled steel sheet (SPCC, SPCE, or the like), a hot rolled steel sheet, a stainless steel, a lightweight alloy steel sheet such as a boron or magnesium alloy, unlike being manufactured by a post-processing scheme according to the related art in which aluminum (Al) is die-cast and burrs, or the like, generated due to the die-casting is then removed.

Therefore, since the base 100 according to the embodiment of the present invention may be manufactured by the press processing, a process time and energy consumption are significantly reduced, whereby production capability may be improved.

However, in the case in which the base 100 is manufactured by the press processing, that is, in the case in which the base 100 is manufactured by disposing a plate-shaped steel as a base material, that is, a cold rolled steel sheet (SPCC, SPCE, or the like) or a hot rolled steel sheet in a press mold and pressing the plate-shaped steel at a predetermined pressure, the base 100 may not basically have a uniform thickness.

Therefore, rigidity of the base body 110 on which a disk D is disposed may be inevitably insufficient. In order to secure rigidity, the base 100 according to the embodiment of the present invention may include one or more ribs 112.

More specifically, the ribs 112 may be provided in plural and the plurality of ribs 112 may be depressed from one surface of the base body 110 and protruded toward the other surface thereof to have a radial shape.

That is, the ribs 112 may be depressed from an upper surface of the base body 110 and protruded toward a lower surface thereof, and may be formed in a direction perpendicular to a rotation direction of the disk D.

Here, a width and a depression depth of the ribs 112 in the rotation direction of the disk D are not determined to be constant, and may be variously changed in consideration of a relationship between a thickness and rigidity of the base 100.

Meanwhile, in the case in which the disk D rotates at a high speed on the base body 110, pressure at an outer side of the base body 110 may be increased as compared to that of an inner side thereof by the rotation of the disk D.

That is, at the time of the rotation of the disk D, the pressure may be increased inwardly in a radial direction, which may be a phenomenon generated due to a difference in linear velocity between respective points in the radial direction of the disk D.

Here, the difference in pressure may cause a defect in which various foreign objects are directed toward a center of the disk D along the ribs 112 formed in the base body 110 in order to secure the rigidity of the base body 110.

Therefore, the base assembly 100 according to the first embodiment of the present invention prevents the defect in advance by including the blocking parts 200 provided in the ribs 112 in order to block abnormal air flow by the ribs 112. A detailed description thereof will be provided below.

The outer wall part 120 may be formed on the outer side of the base body 110 to thereby define the outer side of the base body 110 and be formed by bending an edge of the base body 110.

In other words, a shape of an internal space formed by a combination of upper and lower molds for pressing or forging corresponds to that of the outer wall part 120 and the base body 110, whereby the base 100 according to the embodiment of the present invention may be manufactured by a single process.

However, after the base 100 may be fabricated to have a basic shape by single press processing, the base 100 may be formed to have a final shape by bending and additional press processing.

In this case, the outer wall part 120 may be bent downwardly from the edge of the outer side of the base body 110 in an axial direction or be bent upwardly from the edge of the outer side of the base body 110 in the axial direction and then be bent downwardly in the axial direction.

The blocking parts 200, components for preventing the foreign objects from collecting in the center of the disk D through the ribs 112 having a radial shape, due to the difference in pressure generated at the time of the rotation of the disk D, may be provided in the ribs 112.

More specifically, the blocking parts 200 may be filled in a space formed by the ribs 112 to thereby block movement of the foreign objects through the space formed by the ribs 112 in advance.

The blocking parts 200 may have upper surfaces disposed co-planarly with upper surfaces of portions of the base body 110 between the ribs 112 and may be coupled to the ribs 112 through insert injection or outsert injection after the base body 110 and the outer wall part 120 are formed by press processing.

Here, the blocking parts 200 may be formed of a resin made of a rubber material.

In addition, the blocking parts 200 may also be manufactured separately from the base 100 using a resin made of a rubber material and be coupled to the ribs 112 by a bonding process or an adhering process by an adhesive tape.

Further, the blocking parts 200 may be formed of a metallic material and be coupled to the ribs 112 by insert injection or outsert injection.

In addition, the blocking parts 200 may also be separately manufactured using a metallic material and be then coupled to the ribs 112 by a bonding method, a welding method, or an adhering method by an adhesive tape.

The spindle motor 400, which is to rotate the disk ID, may be fixedly mounted on a central portion of the base body 110.

The disk ID, which is coupled to the spindle motor 400 to thereby rotate together with the spindle motor 400, may have a writing surface on which data is written.

Here, the spindle motor 400 may includes a clamp 410 coupled to an upper portion thereof by a screw 420 in order to firmly fix the disk D thereto.

In addition, although FIG. 1 shows a configuration in which the disk D is singularly mounted on the spindle motor 400, this configuration is only an example. That is, at least one disk D may be mounted on the spindle motor 400.

In the case in which a plurality of disks ID are mounted, a ring shaped spacer for maintaining an interval between the plurality of disks D may be disposed between the disks D.

The head driver 500 is called a head stack assembly (HAS) and may be a component having a magnetic head mounted thereon and moving the magnetic head to a predetermined position to thereby write the data on the disk D or read the data written on the disk D.

In addition, the head driver 500 may move the magnetic head to a predetermined position of the disk D by a voice coil motor (VCM) including a coil 510 and upper and lower magnets 520 and 530.

Here, each of the upper and lower magnets 520 and 530 disposed on upper and lower portions of the coil 510 provided in the VCM may be coupled to upper and lower yokes 540 and 550 in order to increase magnetic flux density and to be fixed to the base 100.

The VCM may be controlled by a servo control system and rotate the head driver 500 around a pivot axis in a direction according to the Fleming's left hand rule by interaction between current input by the coil 510 provided in the VCM and magnetic fields formed by the upper and lower magnets 520 and 530.

Here, when an operation start command is input to the hard disk drive 700 according to the embodiment of the present invention, the disk D starts to rotate, and the VCM rotates a swing arm in a counterclockwise direction and moves the magnetic head onto the writing surface of the disk D.

On the other hand, when an operation stop command is input to the hard disk drive 700 according to the embodiment of the present invention, the VCM rotates the swing arm in a clockwise direction to thereby allow the magnetic head to deviate from the disk D.

The magnetic head deviating from the writing surface of the disk D is parked in a ramp 560 provided outside the disk D.

Here, the ramp 560 may allow the magnetic head to be spaced apart from the disk D in the case in which the magnetic head moves to the disk D, simultaneously with allowing the magnetic head to be parked, whereby data of the disk D may be stably read.

Figure 3A:
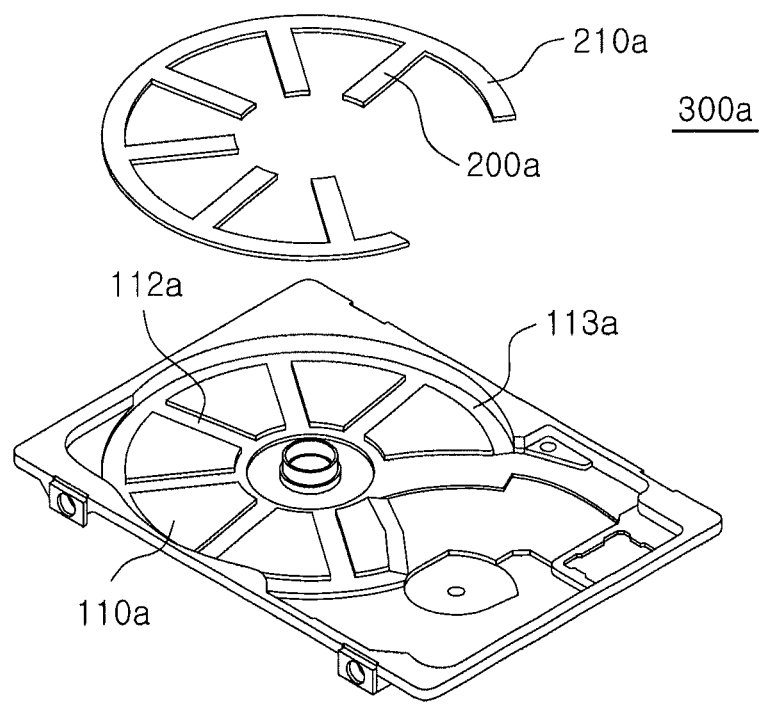
FIGS. 3A and 3B are, respectively, a schematic exploded perspective view and a schematic perspective view showing a base assembly for a motor according to a second embodiment of the present invention.
Figure 3B:
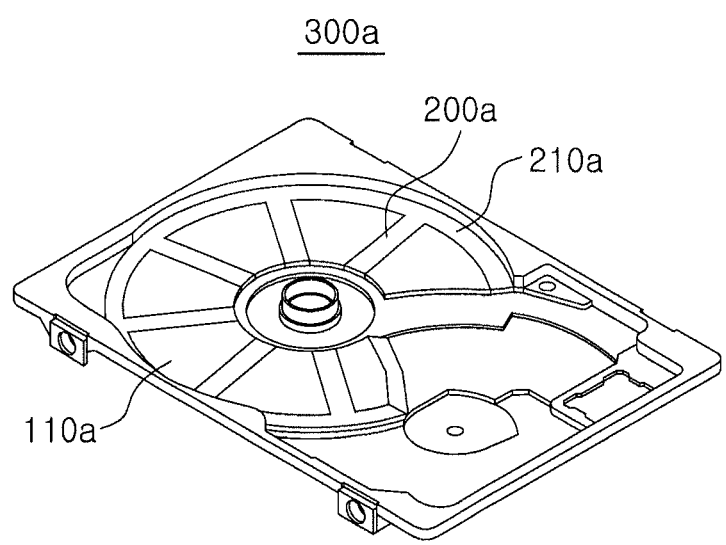

FIGS. 3A and 3B are, respectively, a schematic exploded perspective view and a schematic perspective view showing a base assembly for a motor according to a second embodiment of the present invention.

Referring to FIGS. 3A and 3B, a base assembly 300a according to the second embodiment of the present invention has the same configuration and effect as those of the base assembly 300 according to the first embodiment of the present invention described with reference to FIGS. 1 through 2B except for a rib connecting part 113a and a blocking part connecting part 210a. Therefore, a description except for the rib connecting part 113a and the blocking part connecting part 210a will be omitted.

The base body 110a may include a plurality of ribs 112a formed therein in order to secure rigidity and having a radial shape, and the plurality of ribs 112 may be connected to each other by the rib connecting part 113a.

The rib connecting part 113a may be depressed from an upper surface of a base body 110a and protruded toward a lower surface thereof, similar to the ribs 112a, and be formed on an outer side of the ribs 112a.

However, although FIGS. 3A and 3B shows that the rib connecting part 113a has a shape along the rotation direction of the disk D, the rib connecting part 113a is not necessarily limited to having the above-mentioned shape, but may have any shape as long as it may connected the plurality of ribs 112a to each other.

Meanwhile, blocking parts 200a filled in a space formed by the ribs 112a may have a shape corresponding to those of the ribs 112a and the rib connecting part 113a and include a blocking part connecting part 210a coupled to the rib connecting part 113a.

The blocking parts 200a may be formed integrally by the blocking part connecting part 210a. Therefore, a process of coupling the blocking parts 200a to the ribs 112a may be simplified and productivity may be increased.

Figure 4A:
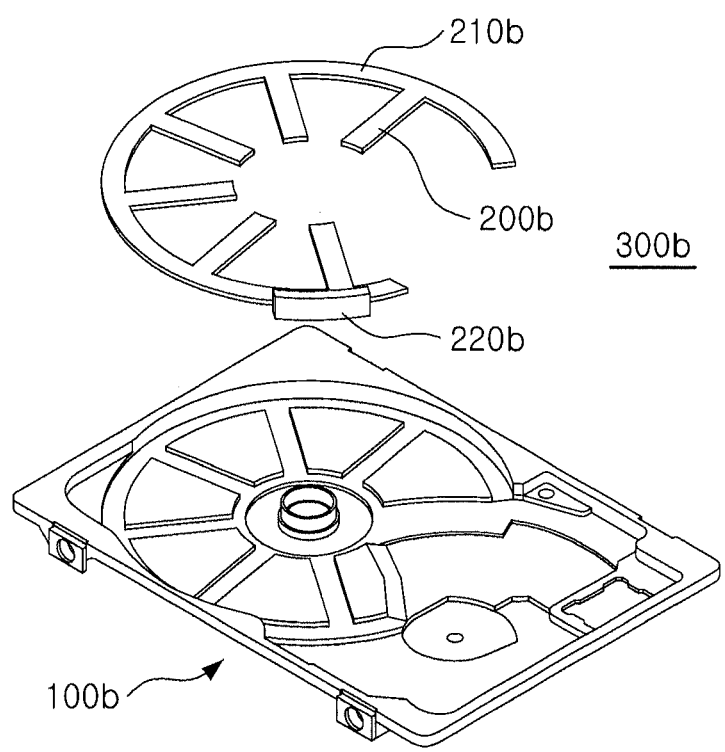
FIGS. 4A and 4B are, respectively, a schematic exploded perspective view and a schematic perspective view showing a base assembly for a motor according to a third embodiment of the present invention.
Figure 4B:
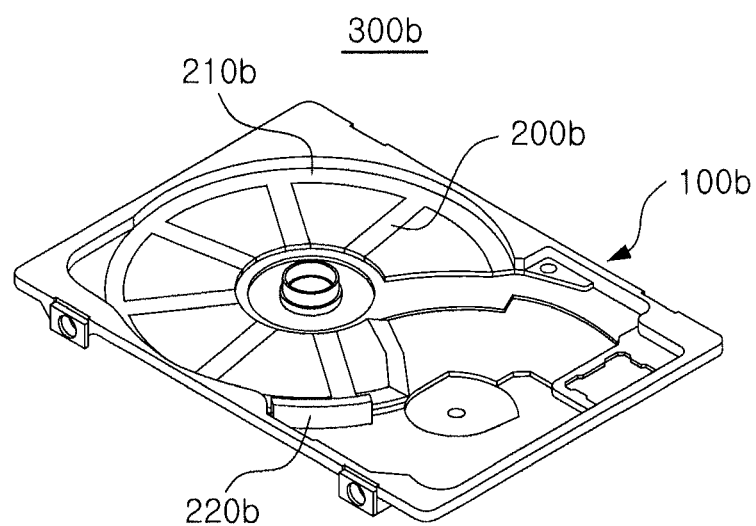

FIGS. 4A and 4B are, respectively, a schematic exploded perspective view and a schematic perspective view showing a base assembly for a motor according to a third embodiment of the present invention.

Referring to FIGS. 4A and 4B, a base assembly 300b according to the third embodiment of the present invention has the same configuration and effect as those of the base assembly 300a according to the second embodiment of the present invention described with reference to FIGS. 3A and 3B except for a shroud 220b. Therefore, a description except for the shroud 220b will be omitted.

The blocking parts 200b may include the shroud 220b forming a clearance with an outer diameter of the disk D and suppressing a generation of a vortex at the time of the rotation of the disk D.

Here, the shroud 220b may be formed integrally with the blocking parts 200b and the blocking part connecting part 210b and have the same radius of curvature as that of the outer diameter of the disk D.

In addition, an interval between the shroud 220b and the disk D may be the same as an interval between the outer diameter of the disk D and the base 110b, and a height of the shroud 220b is freely changeable in a range in which the generation of the vortex is prevented.

Figure 5A:
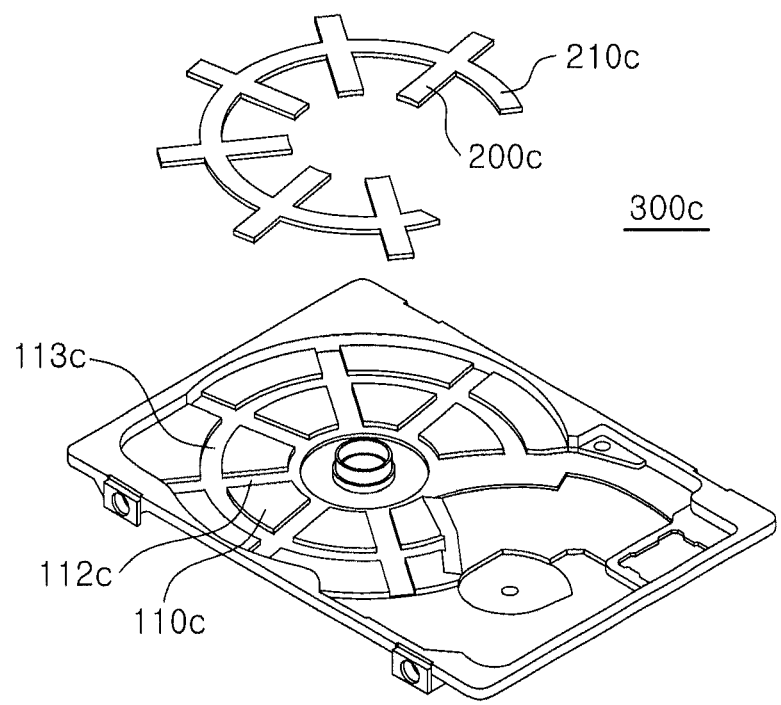
FIGS. 5A and 5B are, respectively, a schematic exploded perspective view and a schematic perspective view showing a base assembly for a motor according to a fourth embodiment of the present invention.
Figure 5B:
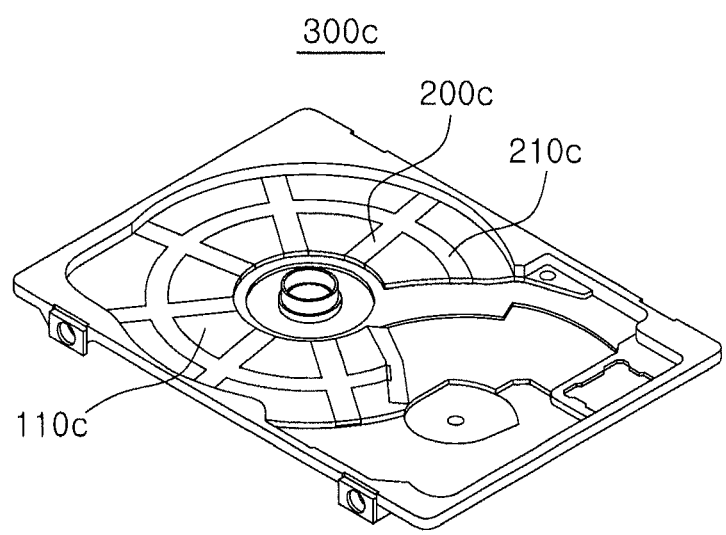
Figure 6A:
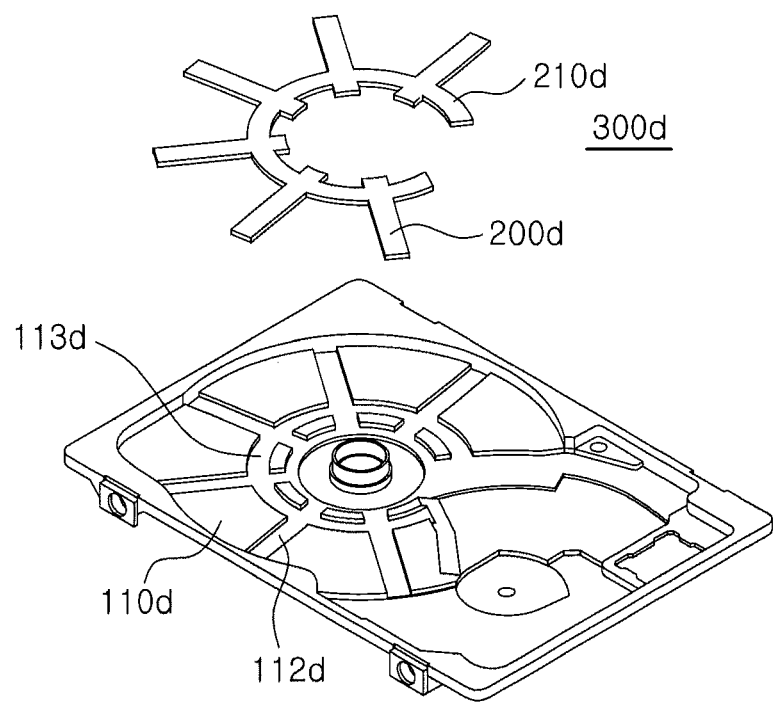
FIGS. 6A and 6B are, respectively, a schematic exploded perspective view and a schematic perspective view showing a base assembly for a motor according to a fifth embodiment of the present invention.
Figure 6B:
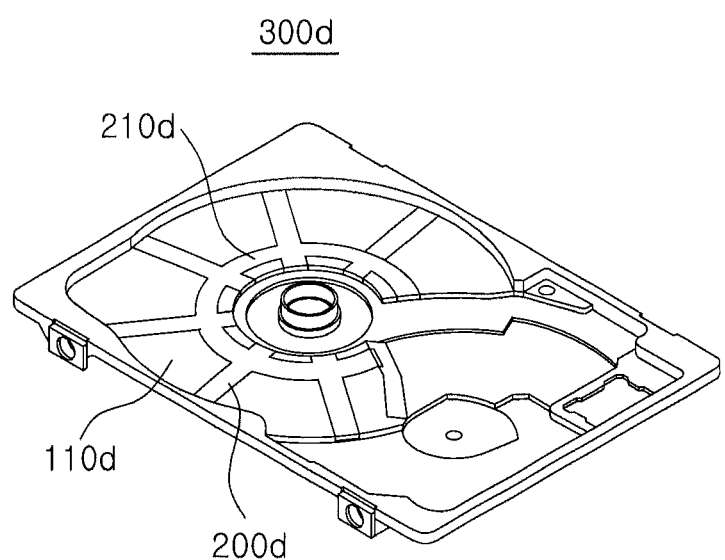

FIGS. 5A and 5B are, respectively, a schematic exploded perspective view and a schematic perspective view showing a base assembly for a motor according to a fourth embodiment of the present invention; and FIGS. 6A and 6B are, respectively, a schematic exploded perspective view and a schematic perspective view showing a base assembly for a motor according to a fifth embodiment of the present invention.

Referring to FIGS. 5A through 6B, base assemblies 300c and 300d according to the fourth and fifth embodiment of the present invention have the same configuration and effect as those of the base assembly 300a according to the second embodiment of the present invention described with reference to FIGS. 3A and 3B except for rib connecting parts 113c and 113d formed in base bodies 110c and 110d and blocking part connecting parts 210c and 210d. Therefore, a description other than the rib connecting parts 113c and 113d and the blocking part connecting parts 210c and 210d will be omitted.

The rib connecting parts 113c and 113d may be formed in an approximately central portion (See FIGS. 5A and 53) of a plurality of ribs 112c and 112d having a radial shape or formed in an inner portion thereof (See FIGS. 6A and 6B), and the blocking part connecting parts 210c and 210d may have a shape corresponding to that of the rib connecting parts 113c and 113d.

However, although FIGS. 5A through 6B shows that the rib connecting parts 113c and 113d have a shape along the rotation direction of the disk D, the rib connecting parts 113c and 113d are not necessarily limited to having the above-mentioned shape.

The blocking parts 200c and 200d may be formed integrally by the blocking part connecting parts 210c and 210d, respectively. Therefore, a process of coupling the blocking parts 200c and 200d to the rib 112c and 112d may be simplified and productivity may be increased.

Figure 7A:
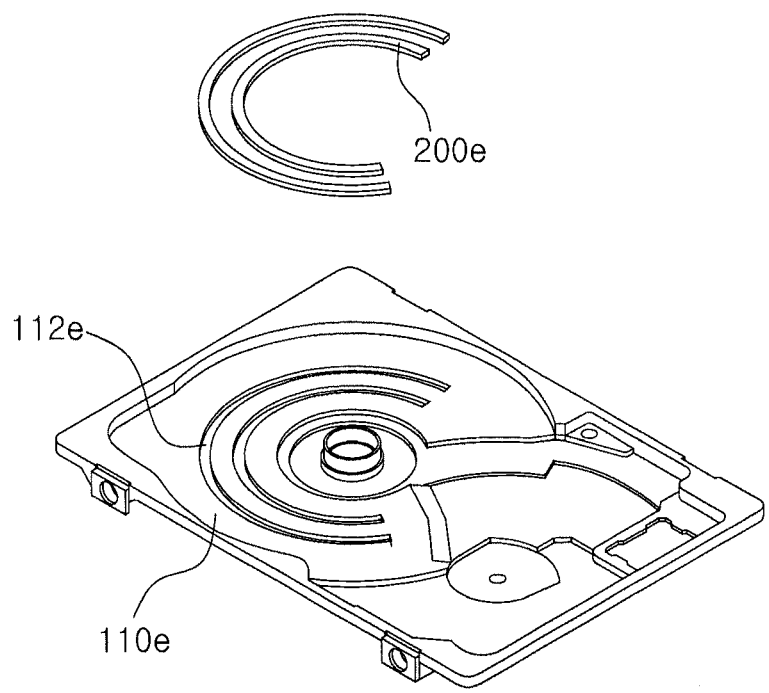
FIGS. 7A and 7B are, respectively, a schematic exploded perspective view and a schematic perspective view showing a base assembly for a motor according to a sixth embodiment of the present invention.
Figure 7B:
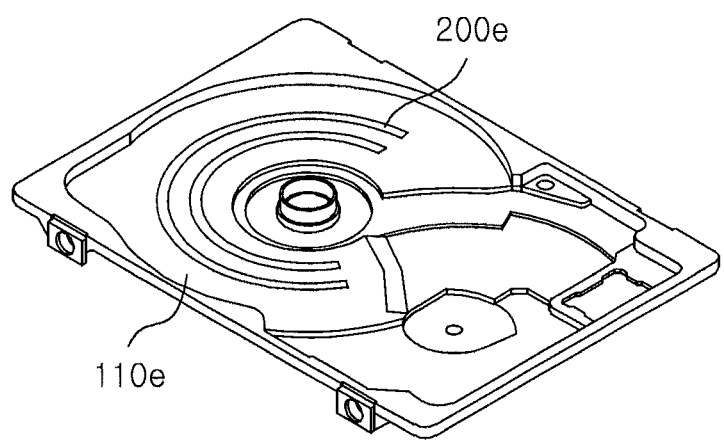
Figure 8A:
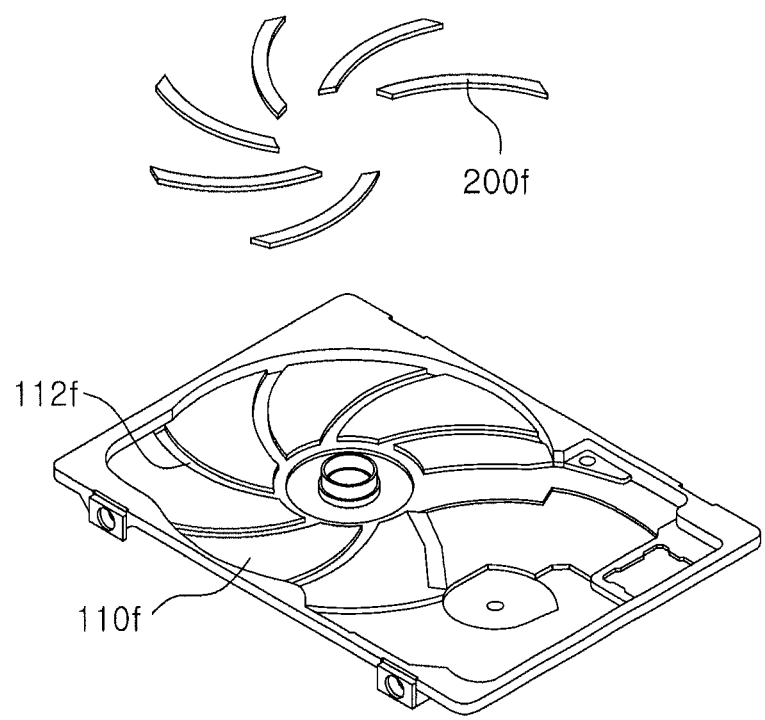
FIGS. 8A and 8B are, respectively, a schematic exploded perspective view and a schematic perspective view showing a base assembly for a motor according to a seventh embodiment of the present invention.
Figure 8B:
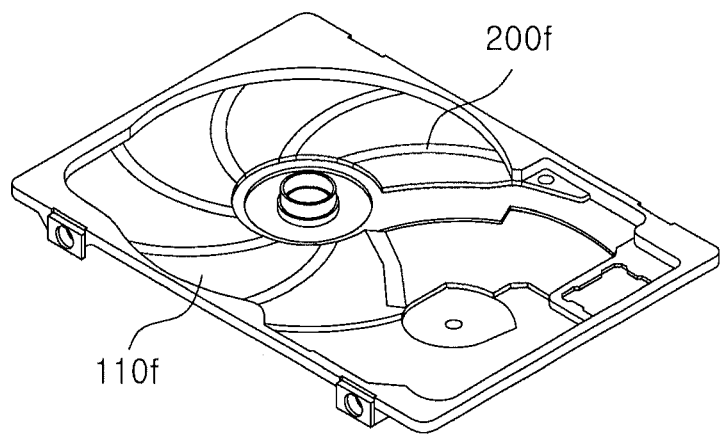

FIGS. 7A and 7B are, respectively, a schematic exploded perspective view and a schematic perspective view showing a base assembly for a motor according to a sixth embodiment of the present invention; FIGS. 8A and 8B are, respectively, a schematic exploded perspective view and a schematic perspective view showing a base assembly for a motor according to a seventh embodiment of the present invention; and FIGS. 9A and 9B are, respectively, a schematic exploded perspective view and a schematic perspective view showing a base assembly for a motor according to an eighth embodiment of the present invention.

Referring to FIGS. 7A through 9B, the base assemblies according to the sixth to eighth embodiment of the present invention have the same configuration and effect as those of the base assembly according to the embodiment of the present invention described above except for a shape of ribs 112e, 112f, and 112g. Therefore, a description other than the shape of the ribs 112e, 112f, and 112g will be omitted.

Figure 9A:
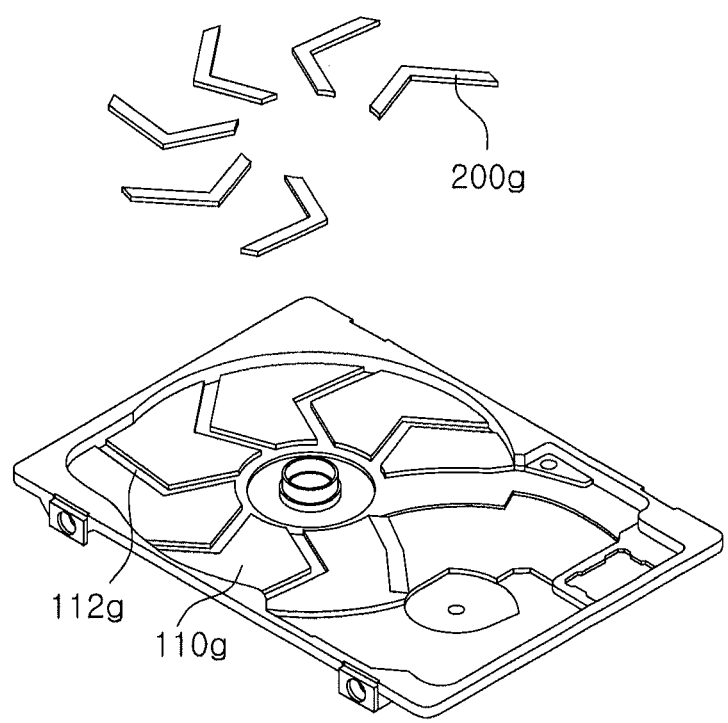
FIGS. 9A and 9B are, respectively, a schematic exploded perspective view and a schematic perspective view showing a base assembly for a motor according to an eighth embodiment of the present invention.
Figure 9B:
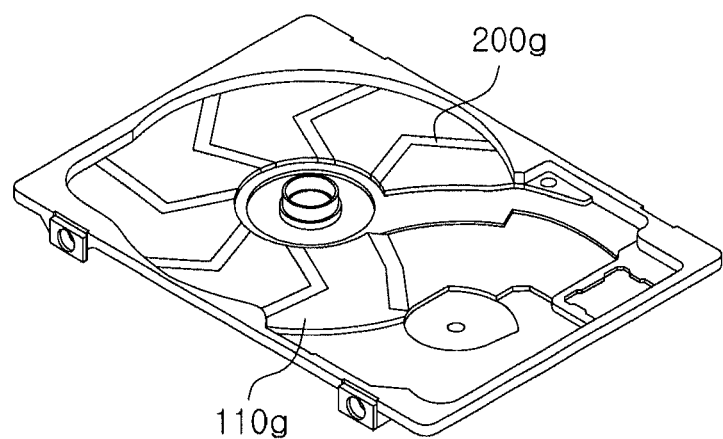

The ribs 112e, 112f, or 112g may be depressed from an upper surface of a base body 110e, 110f, or 110g and protruded toward a lower surface thereof and have a circular arc shape (See FIGS. 7A and 7B), a helical shape (See FIGS. 8A and 8B), or a herringbone shape (See FIGS. 9A and 9B).

Rigidity of the bearing body 110e, 110f, and 110g may be increased due to the ribs 112e, 112f, and 112g having the above-mentioned shape, and abnormal air flow by the ribs 112e, 112f, and 112g may be blocked in advance due to the blocking parts 200e, 200f, and 200g corresponding to the ribs 112e, 112f, and 112g.

However, although not shown, each of the ribs 112e, 112f, and 112g and the blocking parts 200e, 200f, and 200g may be connected by the rib connecting part and the blocking part connecting part described with reference to FIGS. 2A through 6B.

As set forth above, with the base assembly for a motor and the hard disk drive including the same according to the embodiments of the present invention, base rigidity may be improved by the rib even in the case of press processing.

In addition, the air flow generated due to the rib for securing the rigidity is blocked in advance, whereby the performance and lifespan of the base may be significantly increased.

Further, the base for a motor is manufactured by the press processing to significantly reduce the process time and the energy consumption, whereby the production capability may be improved.

While the present invention has been shown and described in connection with the embodiments, it will be apparent to those skilled in the art that modifications and variations can be made without departing from the spirit and scope of the invention as defined by the appended claims.

What is claimed is:

1. A base assembly for a motor, the base assembly comprising:
    a base body defining a bottom surface of the base assembly and having a disk disposed thereon;
    an outer wall part defining a side wall of the base assembly and defining an outer side of the base body;
    one or more ribs depressed from the disk disposing surface of the base body and protruded toward the other surface thereof to thereby improve rigidity of the base body; and
    one or more blocking parts provided in the depressed part of the ribs to thereby prevent occurrence of abnormal air flow due to the ribs at a time of rotation of the disk.

2. The base assembly of claim 1, wherein the blocking parts are filled in a space formed by the ribs.

3. The base assembly of claim 1, wherein the blocking parts have upper surfaces disposed co-planarly with upper surfaces of portions of the base body between the ribs.

4. The base assembly of claim 1, wherein the blocking parts are coupled to the ribs by an injection process.

5. The base assembly of claim 1, wherein the blocking parts are formed of a metallic material.

6. The base assembly of claim 1, wherein the blocking parts are coupled to the ribs by at least one of a bonding method, a welding method, and an adhering method by an adhesive tape.

7. The base assembly of claim 1, wherein the ribs have at least one of a circular arc shape, a helical shape, a spiral shape, a herringbone shape, and a radial shape.

8. A hard disk drive comprising:
    the base assembly for a motor of claim 1;
    a spindle motor coupled to the base body to thereby rotate the disk; and
    a head driver moving a magnetic head to a predetermined position on the disk, the magnetic head writing data on the disk and reproducing data written on the disk.

9. A base assembly for a motor, the base assembly comprising:
    a base body having a disk disposed thereon;
    an outer wall part defining an outer side of the base body;

one of more ribs depressed from one surface of the base body and protruded toward the other surface thereof to thereby improve rigidity of the base body; and one or more blocking parts provided in the ribs to thereby block abnormal air flow due to the ribs at a time of rotation of the disk, wherein the blocking parts include a shroud forming a clearance with an outer diameter of the disk and suppressing a generation of a vortex at the time of the rotation of the disk.

10. A hard disk drive comprising:

the base assembly for a motor of claim 9;

a spindle motor coupled to the base body to thereby rotate the disk; and a head driver moving a magnetic head to a predetermined position on the disk, the magnetic head writing data on the disk and reproducing data written on the disk.

11. A base assembly for a motor, the base assembly comprising:

a base body having a disk disposed thereon:

an outer wall part defining an outer side of the base body;

one or more ribs depressed from one surface of the base body and protruded toward the other surface thereof to thereby improve rigidity of the base body; and one or more blocking parts provided in the ribs to thereby block abnormal air flow due to the ribs at a time of rotation of the disk, wherein the base body includes a rib connecting part connecting the ribs to each other, and the blocking parts are formed integrally by a blocking part connecting part provided in the rib connecting part.

12. A hard disk drive comprising:

the base assembly for a motor of claim 11;

a spindle motor coupled to the base body to thereby rotate the disk; and a head driver moving a magnetic head to a predetermined position on the disk, the magnetic head writing data on the disk and reproducing data written on the disk.

* * * * *